United States Patent [19]
Henrikson

[11] Patent Number: 6,163,823
[45] Date of Patent: *Dec. 19, 2000

[54] DYNAMIC ADDRESSING OF DEVICES ON A SHARED MEDIUM NETWORK WITH A KEYLINE

[75] Inventor: Gregory K. Henrikson, Brea, Calif.

[73] Assignees: Sony Corporation, Tokyo, Japan; Sony Trans Com Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,754

[22] Filed: Jan. 29, 1997

[51] Int. Cl.[7] ................................................ G06F 13/00
[52] U.S. Cl. ........................... 710/100; 710/9; 710/126; 710/129; 710/103; 710/104; 709/222; 712/20; 700/95
[58] Field of Search ..................................... 395/829, 280, 395/306, 309, 283, 284; 712/20; 700/95; 709/222; 710/9, 100, 126, 129, 103, 104

[56] References Cited

U.S. PATENT DOCUMENTS

| | | |
|---|---|---|
| 5,029,209 | 7/1991 | Strong, Jr. et al. . |
| 5,204,669 | 4/1993 | Dorfe et al. . |
| 5,551,053 | 8/1996 | Nadolski et al. . |
| 5,636,342 | 6/1997 | Jeffries ............................ 395/185.01 |
| 5,664,221 | 9/1997 | Amberg et al. . |
| 5,745,159 | 4/1998 | Wax et al. ................................. 348/8 |
| 5,835,127 | 11/1998 | Booth et al. ............................. 348/8 |
| 5,896,129 | 4/1999 | Murphy et al. ....................... 345/327 |
| 5,939,997 | 8/1999 | Sekine et al. . |
| 6,034,688 | 3/2000 | Greenwood et al. ................. 345/353 |

Primary Examiner—Ayaz R. Sheikh
Assistant Examiner—Rupal D. Dharia
Attorney, Agent, or Firm—Blakely, Sokoloff, Taylor & Zafman LLP

[57] ABSTRACT

A system for assigning unique addresses to a series of electronic units in an in-flight entertainment system. The electronic units are connected via an interconnect bus and a keyline wire. During initialization of the system, each electronic unit is enabled via the keyline. After an electronic unit is enabled, the interconnect bus transfers a unique address to the electronic unit and instructs it to ignore future address write signals. This procedure is repeated for each electronic unit in the series of electronic units. The procedure terminates when the last electronic unit requiring an address has been assigned an address.

15 Claims, 4 Drawing Sheets

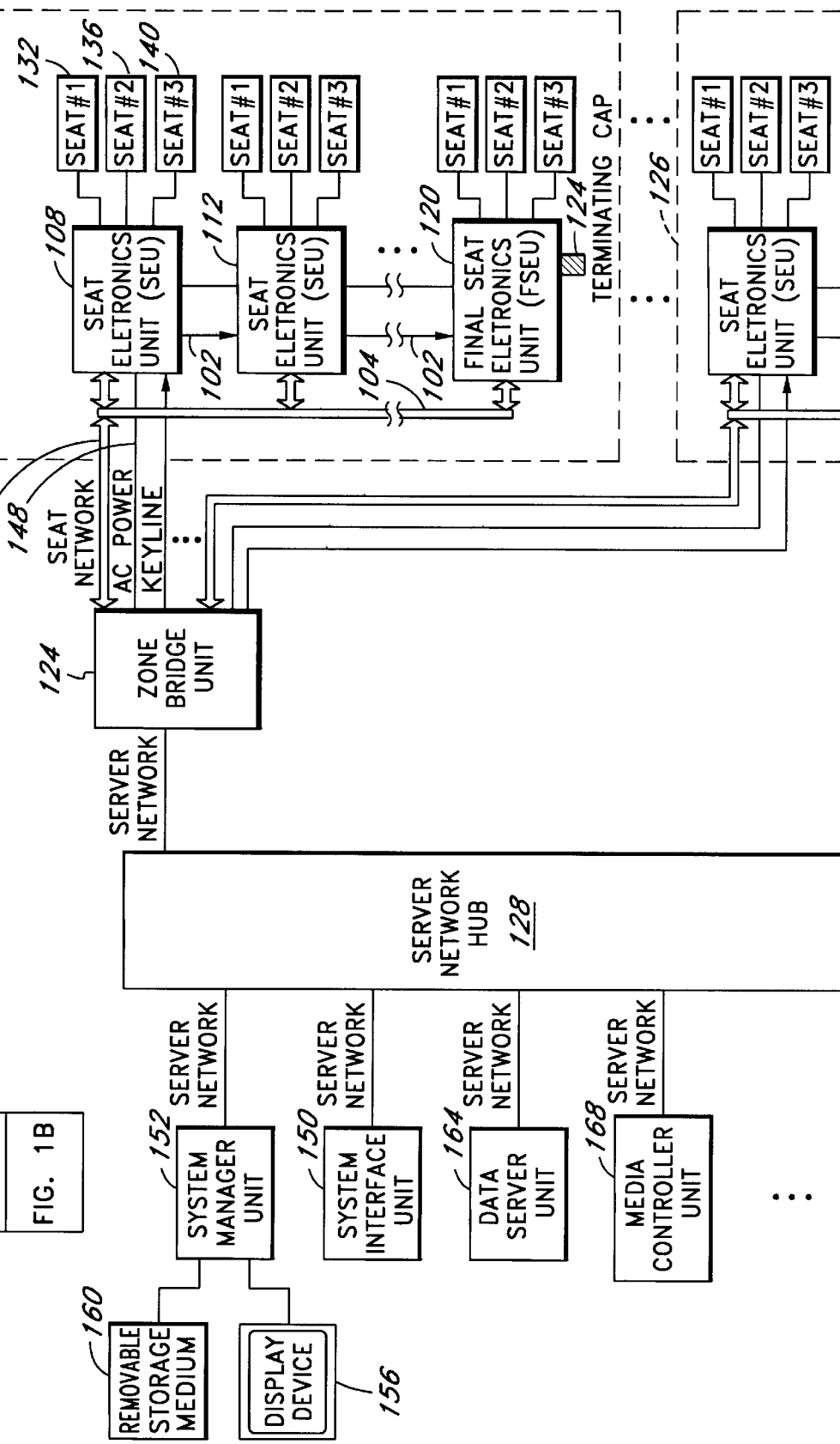

DYNAMIC ADDRESSING OF DEVICES ON A SHARED MEDIUM NETWORK WITH A KEYLINE

BACKGROUND OF THE INVENTION

1. Field of the Invention

The present invention relates to a method and apparatus for initializing electronic units coupled to a bus in an in-flight entertainment system. More particular, the invention relates to assigning and writing addresses to a series of electrical devices connected by an interconnect bus. The assigning of addresses may be done either at initiation of the system or upon reconfiguration during maintenance of the system.

2. Description of Related Art

Over the last few decades, commercial aircraft have become a necessary mode of travel for personal and business reasons. In order to improve passenger comfort, many commercial airlines now offer on-board telephony as well as in-flight entertainment such as video games, pay-per-view movies, hotel reservations services, and the like. Such amenities require supporting electronics distributed through the aircraft. Maintenance of the sophisticated electronics in in-flight entertainment systems (IFES) is a major concern of the airlines.

Airlines value quick servicing and maintenance of aircraft. Aircraft service time is time spent on the ground which results in lost flying time and lost profits. Thus systems which allow quick repairs and facilitate turn around time are an important part of airline profitability. Designs which allow standard parts to be quickly removed and replaced without adjustments are particularly desirable because they reduce maintenance error while simultaneously shortening aircraft servicing time.

One example of a system which is designed to be easily and quickly maintained is the in-flight entertainment system (IFES) designed by Sony Trans Com Inc. of Irvine, Calif.

In the Sony design, diagnostic routines in a system management unit ("SMU") speed up the diagnostic process by identifying particular seat electronic units (SEUs) as defective. The SEUs are coupled together in a daisy chain configuration such that an output of a preceding SEU provides the input to an adjacent SEU. Although a daisy chain configuration is described, other topologies which serially pass information may be used.

Replacing malfunctioning SEUs distributed throughout the passenger section of an aircraft is a time consuming, tedious task because each replacement SEU must be reconfigured by manually assigning parameters such as an address which is unique to each SEU in the chain. Thus, it is desirable to make SEUs throughout the aircraft conform to the same design parameters so that they are easily interchangeable. Making all SEU's interchangeable without significant set-up will allow maintenance personnel to quickly swap and replace defective SEUs with standardized "off the shelf" SEUs significantly simplifying maintenance of the SEUs.

One unique parameter which prevents the rapid swapping of "off-the-shelf" SEUs is that each SEU must be assigned a unique address. Traditionally addresses for such peripheral devices were either hardwired, which impaired flexibility or were set manually by the operator using switches such as dual in line package ("DIP") switches or rotary switches. Hardwiring addresses prevents an operator from replacing a defective SEU with an "off the shelf" SEU without some adjustments. The address hardwired into a new SEU must be the same as the address in the malfunctioning SEU being replaced.

An alternative to hardwiring addresses into the SEU relies on DIP switches manually set by an operator who swaps the SEUs. However manually setting switches to a particular sequence of zeros and ones is a tedious, error prone and time consuming task that significantly slows down the maintenance process. Furthermore, the time pressure of quick aircraft turn around time increases the likelihood of operator error. Improper setting of just one dip switch binary digit will result in the associated SEU being inoperable during the flight and disabling services such as telephone communication to a number of passenger seats.

In view of the ease with which time pressured airline personnel may incorrectly set a switch and the problems associated with using hardwired switches, a quick and efficient automated method of correctly assigning addresses to a series of interconnected electronic units is needed. In particular, a system is needed which, upon initialization, can be used in the field to quickly assign a unique address to each SEU in a chain of SEUs.

SUMMARY OF THE INVENTION

The present invention describes a system and method for assigning a unique address to each electronic unit in a chain of electronic units. The present invention particularly relates to such a system as used in assigning addresses to SEUs in an airborne in-flight entertainment system.

Each peripheral device or SEU of the present invention is coupled to another SEU via an interconnect bus and a keyline. The first SEU in each chain is coupled to a zone bridge unit ("ZBU") which is coupled to a system manager unit ("SMU"). Thus each SEU is indirectly coupled to the SMU.

The SMU controls a zone interface module ("ZIM") within the ZBU. The ZIM manages and transmits signals along the keyline and the interconnect bus to each SEU. Once all SEUs are properly installed, an installation routine within the SMU is executed. This routine assigns a unique address to each of the SEUs in the aircraft.

The installation routine causes the ZIM to transmit a disable signal which disables the keyline output in a particular chain of SEUs. An enable signal is then transmitted along the keyline to the first SEU. The enable signal allows the first SEU to respond to an address write signal broadcast along the interconnect bus. The address write signal causes the first SEU to write its respective address to its memory. An ignore instruction is then addressed to the first SEU instructing the first SEU to ignore subsequent address write signals.

After the first SEU has been initialized with an address, the keyline output of the first SEU is enabled allowing the enable signal to propagate to the next or subsequent SEU in the chain. The enable signal enables the subsequent SEU to respond to broadcast address write signals. A subsequent address corresponding to the newly enabled SEU is broadcast to all of the SEUs in the chain. However, prior enabled SEUs have been instructed to ignore subsequent address write signals. Thus the only enabled SEU to store into memory the corresponding address in flash memory is the most recently enabled or "subsequent" SEU. After storing its address into memory, the subsequent SEU also is individually addressed and instructed to ignore future address write signals. The keyline output of this SEU is then enabled allowing the subsequent SEU to forward the enable signal along the keyline to a neighboring SEU.

The forwarding of the enable signal down the keyline and the subsequent writing of an address to each SEU continues until every SEU in the chain has been assigned a unique address. Once a chain is completed, the ZIM may continue the address assignment procedure down a second daisy chain until every SEU within an aircraft has received a unique address assignment. The entire process takes a matter of only a few minutes and allows maintenance personnel to swap SEUs scattered throughout the plane without worrying about individually and manually addressing each replaced SEU.

BRIEF DESCRIPTION OF THE DRAWINGS

The advantages of the present invention will become more readily apparent to those ordinarily skilled in the art after reviewing the following detailed description and accompanying drawings, wherein:

FIG. 1 which includes FIGS. 1a and 1b illustrates an exemplary in-flight entertainment system for use with a system for dynamically assigning peripheral device addresses.

DETAILED DESCRIPTION OF THE INVENTION

Figure 1B:
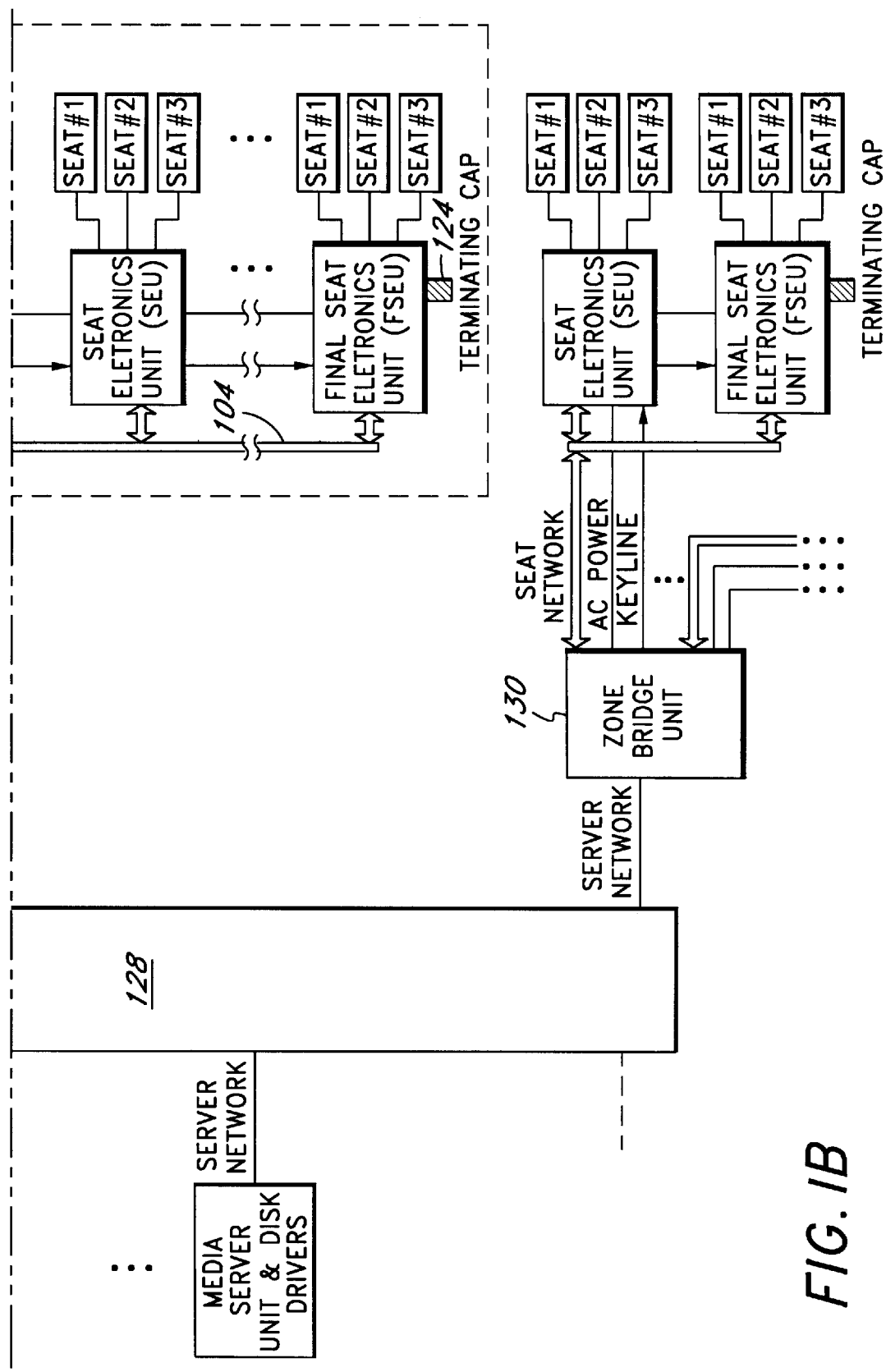

FIGS. 1a and 1b together shows an overall schematic view of the SEU initialization system 100 as used in an IFES for airborne applications. The SEU initialization system 100 includes a multiplexed audio (MA) line or a keyline 102 and a Passenger Service System/Audio Telephone ("PAT") bus or interconnection bus 104, connecting in a chain 106 interconnecting seat electronic units ("SEUs") 108, 112, 120. Each chain 106, is terminated by a final seat electronics unit ("FSEU") 120. A ZBU 124 supports multiple chains 106, 126 and provides each SEU in the chain 106, 126 with the necessary audio and video signals. A Server Network Hub 128 coordinates and communicates the information to and from multiple ZBUs 124, 130 to the SEU chains.

Each SEU, e.g. SEU 108, provides the necessary audio and video signals to support a number of passenger seats 132, 136, 140 in the passenger compartment of an aircraft. In one embodiment an SEU may support two, three or more passenger seats depending on various parameters such as the aircraft configuration used, and the number of slots in an SEU box. In the described embodiment, up to 12 SEUs are chained together although the number of SEUs in a chain may vary.

Each ZBU 124 typically services one section or zone of an aircraft. A ZBU 124 may service multiple chains 106, 126. A typical chain 106, 126 may serve an aisle of a plane while each ZBU 124 serves a plane section. The interconnect bus and keyline together connect each SEU in a chain. Each chain is terminated at a corresponding final seat electronics unit ("FSEU") e.g. FSEU 120. The FSEU includes terminating cap 124 which terminates interconnect bus 104. The terminating caps indicates the termination of a bus and are commercially available. A specially designed terminating cap is described in a co-pending application Ser. No. 08/739,874, also assigned to applicant.

During initialization, the ZBU 124 distributes enable signals along keyline 102. Other exemplary initialization instructions including address write signals, and ignore instructions may be transmitted along PAT bus or interconnect bus 144. After initialization, keyline 102 may be used for other purposes, such as carrying multiplexed audio signals. During normal usage interconnect bus 144 typically carries telephone signals and passenger service signals. Power is sent along a separate power line 148 and video transmission may occur on a separate video bus (not shown) to the SEUs 108, 112, 120. The SEUs may also be coupled together by other buses to facilitate communication of other information.

Each SEU may also transmit data such as credit card information, entertainment requests, or merchandise orders from individual passengers via seat electronics including handsets (not shown) in the vicinity of passenger seat 132, 136, 140 to the ZBU 124 along the PAT bus 144. This information may be routed through the server network hub 128 to other electronics aboard the aircraft, or in the case of telephone or other communication, to public switched telephone networks ("PSTN") or other external networks outside of the aircraft through a system interface unit 150. A system manager unit (SMU) 152 oversees operation of the in-flight entertainment system IFES. The SMU 152 is coupled to a display device 156 which displays passenger requests and system status information. A removable memory device 160, such as a floppy disk drive, is also provided for removably storing data.

The IFES including the SMU 152 and the SEUs 108, 112, 120 is designed to perform an initialization routine after new SEUs have been added or old SEUs have been removed from the IFE system. In particular, upon start-up the SMU may run routines which assign a unique address to each SEU in the aircraft. The exact configuration of the SEUs and thus the respective seat address used will depend on the assignment data stored in a configuration database located in the SMU 152 or the server network hub 128. The model of the aircraft flown (for example, Boeing 747, DC-10, Boeing 767) determines the configuration database contents.

Figure 2:
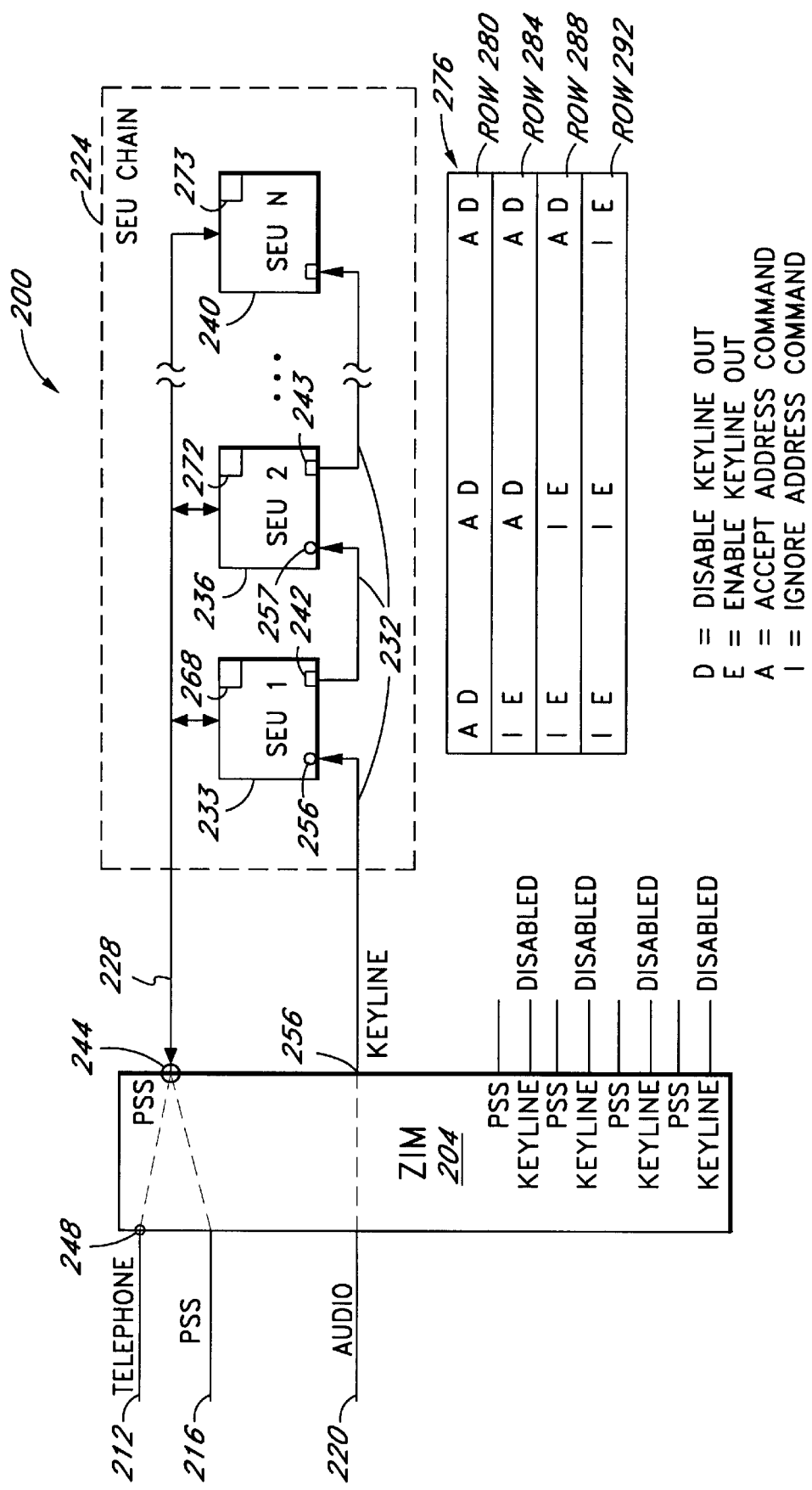
FIG. 2 is an embodiment of the system for dynamically assigning device addresses as shown in a block diagram.

FIG. 2 is a block diagram schematic 200 of the address assignment system. The zone interface module (ZIM) 204 shown in FIG. 2 is a sub-portion of the ZBU 124 shown in FIG. 1a. Each ZIM 204 handles information coming in from telephone lines 212, passenger service system lines (PSS lines) 216 and audio lines 220. Each ZIM 204 routes the information to appropriate SEU chains e.g. SEU chain 224.

Each SEU chain 224 is coupled to the ZIM 204 via an interconnect bus 228 as well as a keyline 232. The interconnect bus 228 is an addressed bus which carries passenger service system ("PSS") data and telephone data between the ZIM 204 and SEUs such as SEU 233, 236, 240 in the SEU chain 224. In one embodiment, the PAT bus is a bi-directional master/slave polled bus which runs between the ZIM 204 and the SEUs 233, 236, 240. The ZIM 204 acts as the interconnect bus master, and each SEU, e.g. 233, 236 coupled to the interconnect bus acts as bus slaves. The interconnect bus 228 itself may be implemented on shielded twisted pair wiring conforming to the RS-485 standard as described in "EIA Standard for Electrical Characteristics of Generators and Receivers for Use in Balanced Digital Multipoint Systems, RS-485," Electronic Industries Association, Washington, D.C., April 1983. One embodiment of such an interconnect bus utilizes a multidrop topology for connection to the SEUs.

In such an embodiment, the interconnect or PAT bus 228 carries data from both the PSS line 216 and the telephone line 212. The PSS data transmitted along PSS line 216 may include switch poll/responses and information on data configurations. The telephone interface 248 may transmit command data along with standard telephone communications. Information on the interconnect bus 228 is routed to each SEU according to a unique 5 bit address assigned to each SEU 233, 336, 240. The interconnect bus 228 may also carry broadcast signals which are received by and acted on by every SEU coupled to the interconnect bus 228.

In the illustrated embodiment of FIG. 2, keyline 232 serves a dual purpose. During the initialization phase, the keyline is used for transferring control signals such as enable or synch signals to the SEUs 233, 236, 240. After the initialization of the system is completed, the keyline 232 can be used to carry multiplexed audio (MA) signals from the ZIM 204 to the SEUs 233, 236, 240.

One implementation of keyline 232 is using the keylines as a shielded twisted pair wire conforming to the RS-485 standard. Other acceptable implementations may use different protocols including optical interconnect standards. The keyline 232 is a uni-directional, non-arbitrated bus. The keyline 232 is coupled to the SEUs in a daisy chain or sequential configuration such that a segment of keyline 232 links a keyline output e.g. 242 to a keyline input e.g. 257 of a neighboring SEU. Signals from the keyline 232 are received and redriven from SEU 233 to the next or subsequent SEU e.g. 236 in the sequence.

Each SEU output 242, 243 which redrives signals propagating along the keyline 232 can be disabled and enabled by a disable command transmitted along the interconnect bus 228. After initialization of the system is complete, the keyline 232 may be used for transferring other types of data. In one embodiment of an in-flight entertainment system, the keyline 232 is used to transfer audio information from storage devices (e.g. compact disk players, and media servers) to individual passengers via headphones.

Each SEU chain 224 includes a final SEU (FSEU) 240 which terminates the SEU chain 224. Intermediate SEUs 233, 236 are SEUs between the ZIM 204 and the final SEU 240. The intermediate SEU's along with the keyline couple the final SEU 240 to the ZIM 204. In one embodiment, the SEUs in a chain are sequentially connected in a chain such that the keyline 252 inputs data into an SEU e.g. SEU 233 via ZIM 204 keyline output 256. Each intermediate SEU 232, 236 also preferably redrives the signal switching being transmitted along the keyline 232 although on and off switching may be sufficient. The intermediate SEU preferably outputs the redriven signal to the next or subsequent SEU along the keyline via a keyline output 242, 243. Thus for a particular SEU e.g. 240 in a chain to receive data along the keyline, all preceding SEUs e.g. 233, 236 (preceding meaning SEUs connected in the chain serially between the receiving SEU and the ZIM 204) must allow data to flow through the keyline inputs 256, 257 and keyline outputs 242, 243.

As depicted, an interconnect bus or PAT bus 228 in multi-drop line configuration carries telephone and PSS data to each SEU. During the initialization period, address assignments including address write commands may be transmitted as broadcast signals along the PAT bus 228. The address assigned to a particular SEU is stored in a non-volatile erasable memory e.g. 268, 272, 273 in the respective SEU 233, 236, 240. This non-volatile erasable memory may take a variety of forms, in one embodiment a flash memory is used.

The chart 276 shows the various states of each SEU at various points in time during initialization. At a beginning state (Row 280) all SEUs in the SEU chain 224 are set to have their keyline outputs disabled and set to accept address commands. An enable signal is transferred along a first segment of keyline 232 to the first SEU 233 (the SEU closest to the ZIM 204 or the first SEU to receive the enable signal). An assigned address corresponding to the first SEU 233 is broadcast along interconnect bus 228. The first SEU 233 stores the assigned address in its non-volatile erasable memory 268 such as a flash memory circuit. An ignore instruction instructing the first SEU 233 to ignore future address write signals is transmitted along the interconnect bus 228. An enable output instruction causing the first SEU to enable its keyline output 242 is also transmitted along interconnect bus 228 and addressed to the first SEU 233. Thus, after receiving its assigned address, the first SEU 233 is set to ignore future address write commands and enables its keyline output to forward the enable signal to a subsequent or neighboring SEU 236. The status of the SEUs 233, 236, 240 after the first SEU 233 has received its address assignment is shown in Row 284 of the chart.

The first SEU 233 forwards the enable signal along a segment of keyline 232 to a subsequent SEU 236. The address of the subsequent SEU is broadcast in an address write signal via the interconnect bus 228. Preceding SEUs such as the first SEU 233 were instructed to ignore broadcast address write signals when they received their addresses. SEUs further down the chain have not received the enable signal forwarded along the keyline 232 and are thus still disabled. Thus only the most recently enabled SEU 236 assigns the address to its flash memory 272. After writing the address to memory, the SEU 236 is addressed via interconnect bus 228 and instructed to ignore future address commands and to enable its keyline output 243. The status of the SEUs immediately after the subsequent SEU has forwarded the enable command is shown in Row 288.

The procedure for assigning an address to an SEU continues until the last SEU 240 in an SEU chain 224 has received its address at which time every SEU in the chain has an enabled keyline output and is ignoring broadcast address write signals. This state is shown in Row 292. After completion of a chain, a previously disabled keyline output from ZIM 204 is enabled. The assignment process is repeated for every SEU chain connected to ZIM 204 until every SEU in the aircraft has been assigned an address.

Figure 3:
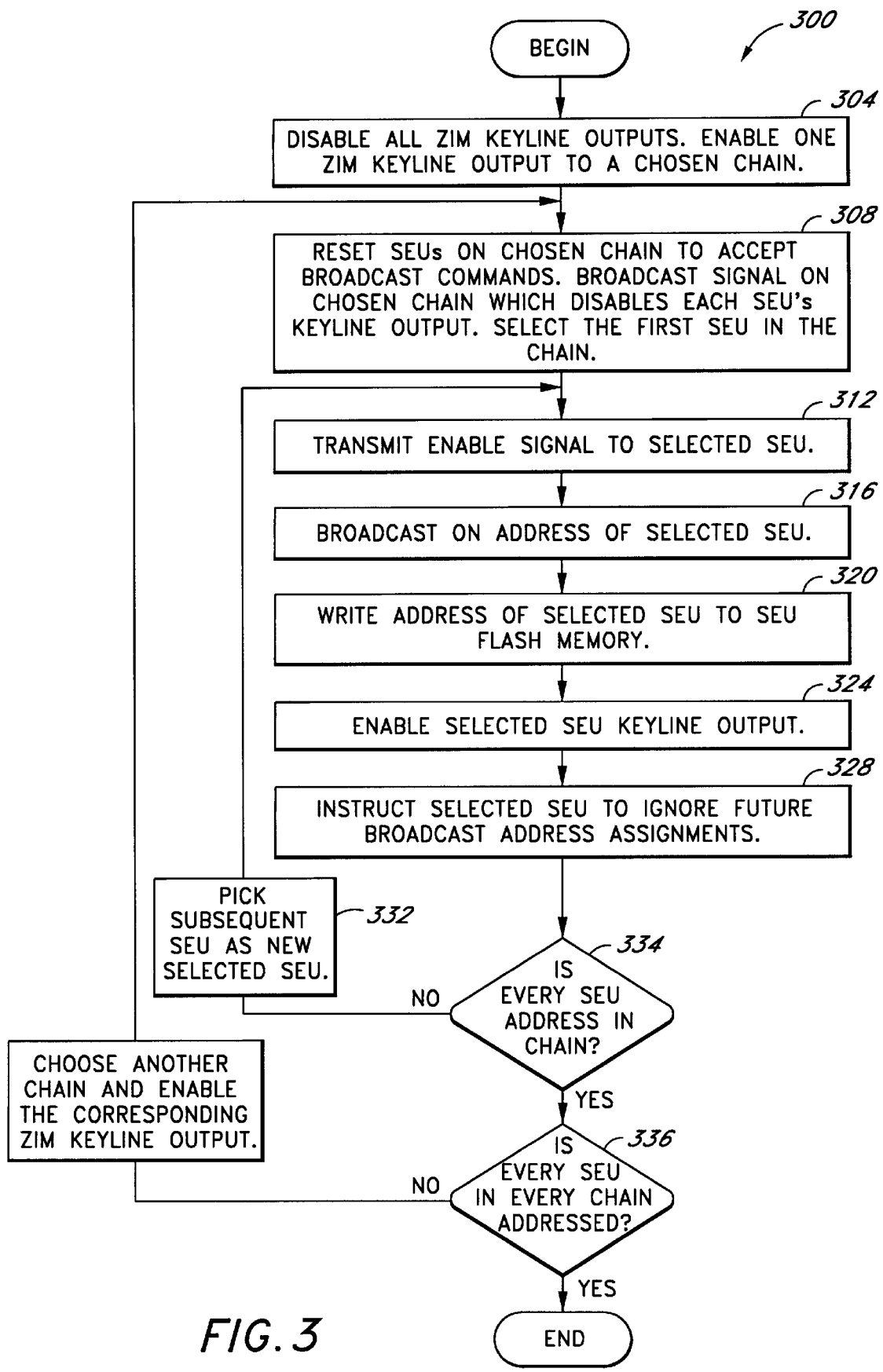
FIG. 3 is a flow chart diagram of one embodiment of the operation of the address assignment circuitry.

FIG. 3 is a flowchart diagram 300 of the operation of the address assignment system. This system is managed by the SMU and ZIM working in combination. The SMU/ZIM combination initially enables only one chosen chain to be addressed. All other ZIM keyline outputs are disabled in step 304. An address control command is then broadcast to the initial chain which disables each SEU keyline output as shown in step 308. To clear holdovers from previous initializations, all SEUs are reset to a condition to accept broadcast commands not specifically targeted to a particular SEU.

In order to enable the first SEU to operate, in step 312 the SMU/ZIM combination transmits an enable signal along the keyline enabling the first or selected SEU and allowing it to write a first broadcast address to memory. The SMU/ZIM combination then broadcasts an address write instruction on the interconnect bus containing the selected SEU address (the selected SEU is the SEU closest to the ZIM that does not have an assigned address). Step 316. Thus, in step 320, the selected SEU records in its nonvolatile erasable memory the appropriate corresponding address.

After the selected SEU has recorded the respective address in its memory, an address control command, particularly an enable instruction addressed to the selected SEU is transmitted instructing the selected SEU to enable its keyline output and forwarding the enable signal to a second selected or subsequent SEU as shown in step 324. In step 328, the SMU/ZIM combination also addresses an ignore address signal addressed to the selected SEU. The ignore address signal instructs the selected SEU to ignore future broadcasted address assignments. Both addressed signals, the address control command and the enable instruction is transmitted along the interconnect bus.

The described process for assigning an address to the selected SEU is repeated for every SEU in the chain as illustrated in Step 332. When the SMU/ZIM determines that the last SEU in a chain has written to its memory a corresponding address, the ZIM perform Step 334 and determines if there are chains which contain SEUs that have not had addresses assigned to them. If a chain remains which includes SEUs without assigned addresses, then the chain is chosen and the procedure for assigning addresses is repeated on the chosen chain in step 336. After every SEU in every chain has written an appropriate address to memory, data in a configuration database is used to verify that the proper number of seats are addressable and have been addressed. The configuration database may be part of the SMU or the ZIM or may be included in other locations accessible to the address assignment system. If there is a discrepancy, appropriate correction procedures may be invoked to determine the cause of the error. Once each SEU in the IFE has written an appropriate address to memory, the system notifies the SMU and direct addressing of the SEUs via their individual addresses may commence.

The invention disclosed has been described as embodied in an in-flight entertainment system to assign addresses to a series of seat electronic units. However, the preceding description should be viewed as an example and not interpreted to limit the invention. The described system for assigning addresses to a series of peripheral devices is useful in a variety of other applications. In particular, applicant views the invention as useful in assigning addresses to communications components and/or entertainment systems in other transportation media such as busses, trains, and ships. The system and method for assigning addresses is also applicable to computer hardware peripherals and other devices in which a quick reliable method of assigning addresses is needed. In particular, applicant notes that the described system can be implemented by using either hardware or software. The system may also be implemented by running particular scripts on an existing processor.

Thus while certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electronic unit comprising:
    a writable memory for storing a changeable address of the electronic unit;
    a command port for receiving an address control command, an address write command, an ignore address command including a first address, and an enable output command including a second address from an interconnect bus;
    an input for receiving a first enable signal;
    an output for transmitting a second enable signal; and
    an address assignment circuit coupled to the writable memory, the command port, the input, and the output, wherein the address assignment circuit
        responds to the address control command by disabling the output and resetting the electronic unit to a condition that accepts commands not specifically targeted to a particular electronic unit,
        responds to the address write command, if the input is receiving an enable signal, by writing a device address in the writable memory,
        responds to the ignore address command if the first address matches the device address, by not responding to subsequent address write commands, and
        responds to the enable output command if the second address matches the device address, by enabling the output.

2. The electronic unit of claim 1 wherein enabling the output transmits the second enable signal on the output.

3. The electronic unit of claim 1 wherein enabling the output causes the electronic unit to couple the output to the input.

4. A method for setting an address of an electronic unit comprising:
    receiving an address control command, said address control command disabling an output of the electronic unit and placing the electronic unit in a first state;
    receiving an enable signal on an input of the electronic unit that places the electronic unit in a second state;
    receiving an address write command, said address write command setting the address of the electronic unit if the electronic unit is in the second state;
    receiving an enable output command containing the address, said enable output command enabling the output of the electronic unit; and
    receiving an ignore address command containing the address, said ignore address command placing the electronic unit in a third state in which the address write command is ignored.

5. The method of claim 4 wherein enabling the output transmits a second enable signal on the output.

6. The method of claim 4 wherein enabling the output causes the electronic unit to couple the output to the input.

7. A managing unit comprising:
    a command port for providing commands to a receiving unit on an interconnect bus, said commands including an address control command, an address write command, an ignore address command addressed to the receiving unit, an enable output command addressed to the receiving unit;
    a managing unit keyline output coupled to a receiving unit keyline input of the receiving unit; and
    an address assignment circuit coupled to the command port, and the managing unit keyline output, wherein the address assignment circuit
        broadcasts the address control command, said address control command causing the receiving unit to disable a receiving unit keyline output of the receiving unit and reset the receiving unit to a condition that accepts commands not specifically targeted to a particular receiving unit,
        enables the managing unit keyline output, thereby enabling the receiving unit keyline input,
        broadcasts the address write command, said address write command causing the receiving unit to store a device address assigned by the address write command if the receiving unit keyline input is enabled, transmits the ignore address command, said ignore address command causing the receiving unit to ignore subsequent address write commands, and transmits the enable output command, said enable output command causing the receiving unit to enable the receiving unit keyline output.

8. The managing unit of claim 7 wherein the enable output command causes the receiving unit to enable the receiving unit keyline output by causing the receiving unit to transmit a second enable signal on the receiving unit keyline output.

9. The managing unit of claim 7 wherein the enable output command causes the receiving unit to enable the receiving unit keyline output by causing the receiving unit to couple the receiving unit keyline output to the receiving unit keyline input.

10. A method for assigning an address to a receiving unit comprising:

broadcasting an address control command, said address control command causing the receiving unit to disable a receiving unit keyline output of the receiving unit and reset the receiving unit to a condition that accepts commands not specifically targeted to a particular receiving unit, enabling a managing unit keyline output, thereby enabling a receiving unit keyline input of the receiving unit, broadcasting an address write command, said address write command causing the receiving unit to store a device address assigned by the address write command if the receiving unit keyline input is enabled, transmitting an ignore address command addressed to the receiving unit, said ignore address command causing the receiving unit to ignore subsequent address write commands, and transmitting an enable output command addressed to the receiving unit, said enable output command causing the receiving unit to enable the receiving unit keyline output.

11. The method of claim 10 wherein the enable output command causes the receiving unit to enable the receiving unit keyline output by causing the receiving unit to transmit a second enable signal on the receiving unit keyline output.

12. The method of claim 10 wherein the enable output command causes the receiving unit to enable the receiving unit keyline output by causing the receiving unit to couple the receiving unit keyline output to the receiving unit keyline input.

13. A system comprising:

a plurality of electronic units, each electronic unit having an address, a keyline input, and a keyline output, each electronic unit initially being in a first state;

an interconnect bus coupled to each electronic unit of the plurality of electronic units;

a keyline coupling the plurality of electronic units in a chain such that the keyline output of a first electronic unit is coupled to the keyline input of a second electronic unit; and a managing unit coupled to the keyline input of the first electronic unit and the interconnect bus, said managing unit configured to assign the address of each of the plurality of electronic units by broadcasting an address control command, said address control command disabling the keyline output for every electronic unit and placing every electronic unit in the first state, providing an enable signal to the keyline input of the first electronic unit, broadcasting an address write command to the plurality of electronic units, said address write command assigning the address of the first electronic unit if the first electronic unit is in the first state and the enable signal is received on the keyline input, issuing an enable output command addressed to the first electronic unit, said enable output command providing the enable signal from the keyline output of the first electronic unit to the keyline input of the second electronic unit, and issuing an ignore address command addressed to the first electronic unit, said ignore address command placing the first electronic unit in a second state in which the address write command is ignored.

14. The system of claim 13 wherein the enable output command provides the enable signal from the keyline output of the first electronic unit by transmitting a second enable signal on the keyline output.

15. The system of claim 13 wherein the enable output command provides the enable signal from the keyline output of the first electronic unit by coupling the keyline output of the first electronic unit to the keyline input of the first electronic unit.

* * * * *